(12) United States Patent
Williams et al.

(10) Patent No.: US 7,822,018 B2
(45) Date of Patent: Oct. 26, 2010

(54) DUPLICATE MEDIA STREAM

(75) Inventors: Jamie Richard Williams, Alpharetta, GA (US); Christopher D. Blair, South Chailey (GB); Richard L. Heap, Chiswick (GB)

(73) Assignee: Verint Americas Inc., Melville, NY (US)

( * ) Notice: Subject to any disclaimer, the term of this patent is extended or adjusted under 35 U.S.C. 154(b) by 64 days.

(21) Appl. No.: 11/394,496

(22) Filed: Mar. 31, 2006

(65) Prior Publication Data

US 2007/0258434 A1    Nov. 8, 2007

(51) Int. Cl.
*H04L 12/66*    (2006.01)

(52) U.S. Cl. .................. 370/352; 370/219; 370/412; 713/200; 713/201; 379/221

(58) Field of Classification Search .................. 370/352, 370/229, 412, 458; 379/390, 432, 401, 221.1, 379/229, 230
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |

(Continued)

FOREIGN PATENT DOCUMENTS

EP    0453128 A2    10/1991

(Continued)

OTHER PUBLICATIONS

"Customer Spotlight: Navistar International," Web pae, unverified print date of Apr. 1, 2002.

(Continued)

*Primary Examiner*—Curtis Kuntz
*Assistant Examiner*—Phung-Hoang J Nguyen
(74) *Attorney, Agent, or Firm*—Lawrence A. Aaronson, PC

(57) ABSTRACT

Included are embodiments of a method for recording in an Internet Protocol (IP) environment. At least one embodiment includes receiving data related to a communication, generating a copied version of at least a portion of the received data, and modifying the copied version of the received data. Other embodiments include sending at least a portion of the modified copied version of the received data to a recording device.

11 Claims, 8 Drawing Sheets

U.S. PATENT DOCUMENTS

| | | | |
|---|---|---|---|
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,229,887 B1 * | 5/2001 | Albers et al. | 379/219 |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,668,044 B1 * | 12/2003 | Schwartz et al. | 379/68 |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 6,987,849 B2 * | 1/2006 | Ravishankar | 379/221.1 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0064149 A1 * | 5/2002 | Elliott et al. | 370/352 |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0079020 A1 | 4/2003 | Gourraud et al. | |
| 2003/0144900 A1 | 7/2003 | Whitmer | |
| 2003/0154240 A1 | 8/2003 | Nygren et al. | |
| 2004/0100507 A1 | 5/2004 | Hayner et al. | |
| 2004/0165717 A1 | 8/2004 | McIlwaine et al. | |
| 2004/0208165 A1 * | 10/2004 | Cai et al. | 370/352 |
| 2005/0138560 A1 | 6/2005 | Lee et al. | |

| | | | | |
|---|---|---|---|---|
| 2006/0227721 | A1* | 10/2006 | Hirai et al. | 370/254 |
| 2007/0053373 | A1* | 3/2007 | FitzGerald et al. | 370/412 |
| 2007/0091789 | A1* | 4/2007 | Thukral | 370/216 |
| 2007/0104096 | A1* | 5/2007 | Ribera | 370/229 |
| 2007/0180137 | A1* | 8/2007 | Rajapakse | 709/231 |
| 2007/0183415 | A1* | 8/2007 | Fischer et al. | 370/389 |
| 2008/0267140 | A1* | 10/2008 | Lee et al. | 370/337 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online Delivers New Web Functionality," Web page, unverified print date of Apr. 2, 2002, unverified cover date of Oct. 5, 1999.

"PriceWaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovslcy, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—The SunTAN Story," Internet Time Group 8 (© 2001).

Cybulski and Linden, "Teaching Systems Analysis and Design Using Multimedia and Patterns," unknown date, unknown source.

De Bra et al, "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *Info World* 20(47):6467 (Nov. 23, 1998).

Unknown Author, "Long-distance learning," *Info World* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Bringing eQuality to Business".

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst. *It's Baa-aack. Now Interative TV is Sneaking Into Your Living Room*, The AnchorDesk, May 10, 1999.

Berst. *Why Interactive TV Won't Turn You On (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*Digital Broadcasting*, Interactive TV News.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

*Interactive TV Overview TimeLine*, Interactive TV News.

*Interactive TV Wars Heat Up*, Industry Standard.

Needle. *Will The Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online 093/28/96.

Kenny. *TV Meets Internet*, PC World Online, Mar. 28, 1996.

Linderholm. *Avatar Debuts Home Theater PC*, PC World Online, Dec. 1, 1999.

Mendoza. *Order Pizza WhileYyou Watch*, ABCNews.com.

Moody. *WebTV: What the Big Deal?*, ABCNews.com.

Murdorf, et al. *Interactive Television—Is There Life After the Internet?*, Interactive TV News.

Needle. *PC, TV or Both?*, PC World Online.

*Interview with Steve Perlman*, CEO of Web-TV Networks, PC World Online.

Press. *Two Cultures, The Internet and Interactive TV*, Universite de Montreal.

Reuters. *Will TV Take Over Your PC?*, PC World Online.

Rohde. *Gates Touts Interactive TV*, Info World, Oct. 14, 1999.

Ross. *Broadcasters Use TV Signals to Send Data*, PC World Oct. 1996.

Schlisserman. *Is Web TV a Lethal Weapon?*, PC World Online.

Stewart. *Interactive Television at Home: Television Meets the Internet*, Aug. 1998.

Swedlow. *Computer TV Shows: Ready for Prime Time?*, PC World Online.

Wilson. *U.S. West Revisits Interactive TV*, Interactive Week, Nov. 28, 1999.

\* cited by examiner

DUPLICATE MEDIA STREAM

BACKGROUND

In Internet Protocol (IP) telephony, the path that the audio packets travel between endpoints generally varies. IP and switched Ethernet networks deliberately switch traffic onto specific routes, oftentimes making it difficult to use traditional passive tap techniques to record the telephony traffic. Generally speaking, as passive tap techniques access the packets somewhere between endpoints, along the route of the phone call, a passive tap has difficulty in that the data can be broken up into discrete packets, which may traverse different paths to reach the desired destination. As encryption of IP traffic becomes more widespread, passive tapping techniques become even more problematic.

Additionally, while some approaches have been implemented that use the duplication of media streams, these current techniques of creating exact (or almost exact) copies of the streams is not without drawbacks. More specifically, current techniques often require additional network capacity to facilitate communication of the duplicate streams. Additionally, the bandwidth utilized between the communications device and the recording device is often twice the bandwidth of the original call. Another drawback of the current techniques is that the packets sent to the recorder are often sent in a very inefficient manner, as echo and jitter reduction techniques are utilized, as in the original call. Further, the compression scheme in many current techniques is chosen on the basis of the network bandwidth and available bandwidth taken by the call, without regard to the path between the communications device and the recording device.

Thus, a heretofore unaddressed need exists in the industry to address the aforementioned deficiencies and inadequacies.

SUMMARY

Included are methods for recording in an Internet Protocol (IP) environment. At least one embodiment of a method includes receiving data related to a communication, generating a copied version of at least a portion of the received data, and modifying the copied version of the received data. Other embodiments include sending at least a portion of the modified copied version of the received data to a recording device.

Also included are embodiments of a computer readable medium for recording in an Internet Protocol (IP) environment. At least one embodiment includes logic configured to receive data related to a communication, logic configured to generate a copied version of at least a portion of the received data, and logic configured to modify the copied version of the received data. Other embodiments include logic configured to send at least a portion of the modified copied version of the received data to a recording device.

Also included are embodiments of a communications device for facilitating a recording in an Internet Protocol (IP) environment. At least one embodiment includes logic configured to receive data related to a communication, logic configured to generate a copied version of at least a portion of the received data, and logic configured to modify the copied version of the received data. Other embodiments include logic configured to send at least a portion of the modified copied version of the received data to a recording device.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 7 is a flowchart illustrating exemplary steps that can be taking by a remote recording device for recording a communication in a communications device, such as the communications network from FIG. 3.

DETAILED DESCRIPTION

One approach to overcome the above listed recording problems is to instruct a device that is party to the call (such as a Voice over Internet Protocol (VoIP) telephone, softphone, or other communications device) to forward copies of the data packets that the communications device is receiving and/or transmitting. In such a configuration, the communications device can send copies of the Real Time Protocol (RTP) packets associated with the call to a recorder. The destination addresses for this data are included in instructions from the recorder to the communications device.

Figure 1:
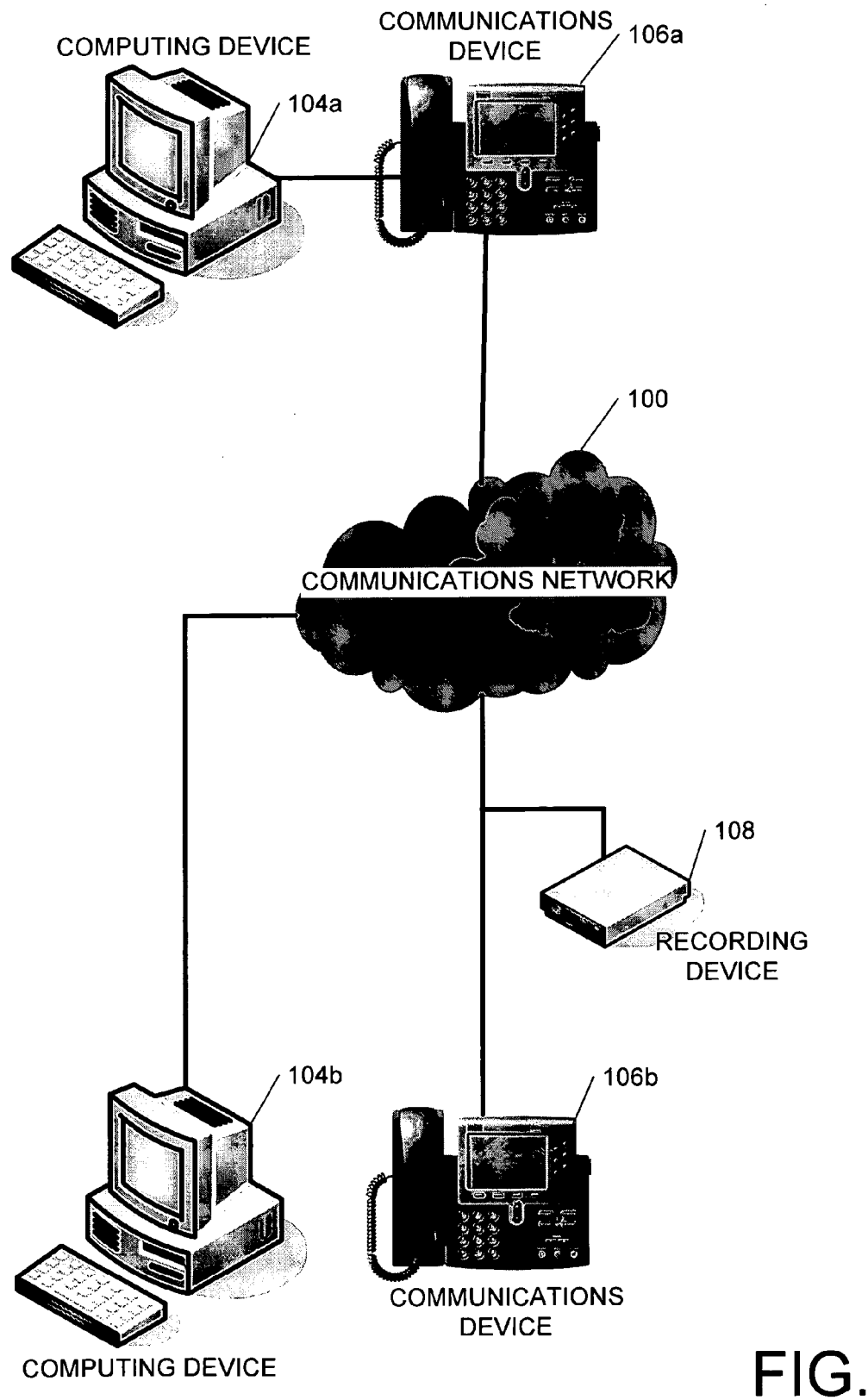
FIG. 1 is an exemplary diagram illustrating a configuration for recording a communication.

FIG. 1 is an exemplary diagram illustrating a configuration for recording a Voice over IP (VoIP) communication. As shown, the nonlimiting example of FIG. 1 includes communications devices 106a, 106b coupled to communications network 100. Communications network can include a Wide Access Network (WAN), the Internet, or other communications network. Additionally communications device 106a, is also coupled to computing devices 104a. In this configuration, computing device 104a, is configured to receive voice data (as well as other data) from a user communicating with a third party via communications device 106b. The computing device 104a is configured to convert the voice data into data recognizable by a data network, such as the Internet (which may form part of communications network 100). Generally speaking the computing device 104a is configured to receive the voice (and visual, depending on the particular configuration) and convert this data into a plurality of Internet Protocol (IP) packets. As one of ordinary skill in the art will understand, the computing device can convert this data according to any of a plurality of protocols. Computing devices 104a, 104b may also be directly (or indirectly, depending on the configuration) coupled to communications network 100 to facilitate communication of the converted data.

Similarly, communications device 106b is coupled to communications network 100. Computing device 104b is also coupled to communications network 100. In this nonlimiting example, a direct connection between the communications device 106b and the computing device 104b is not utilized, as communication between these devices can be facilitated by communications network 100. In many embodiments, the implementation with communications device 106a and computing device 104a is similar in functionality as the configuration with communications device 106b and computing device 104b.

As illustrated in the nonlimiting example of FIG. 1, recording device 108 is coupled between communications network 100 and communications device 106b. While such a configuration can satisfy recording needs of communications device 106b, such a configuration can become unduly costly in network environments that include multiple communications devices, as one or more recording devices would likely be implemented at each site for recording.

Figure 2:
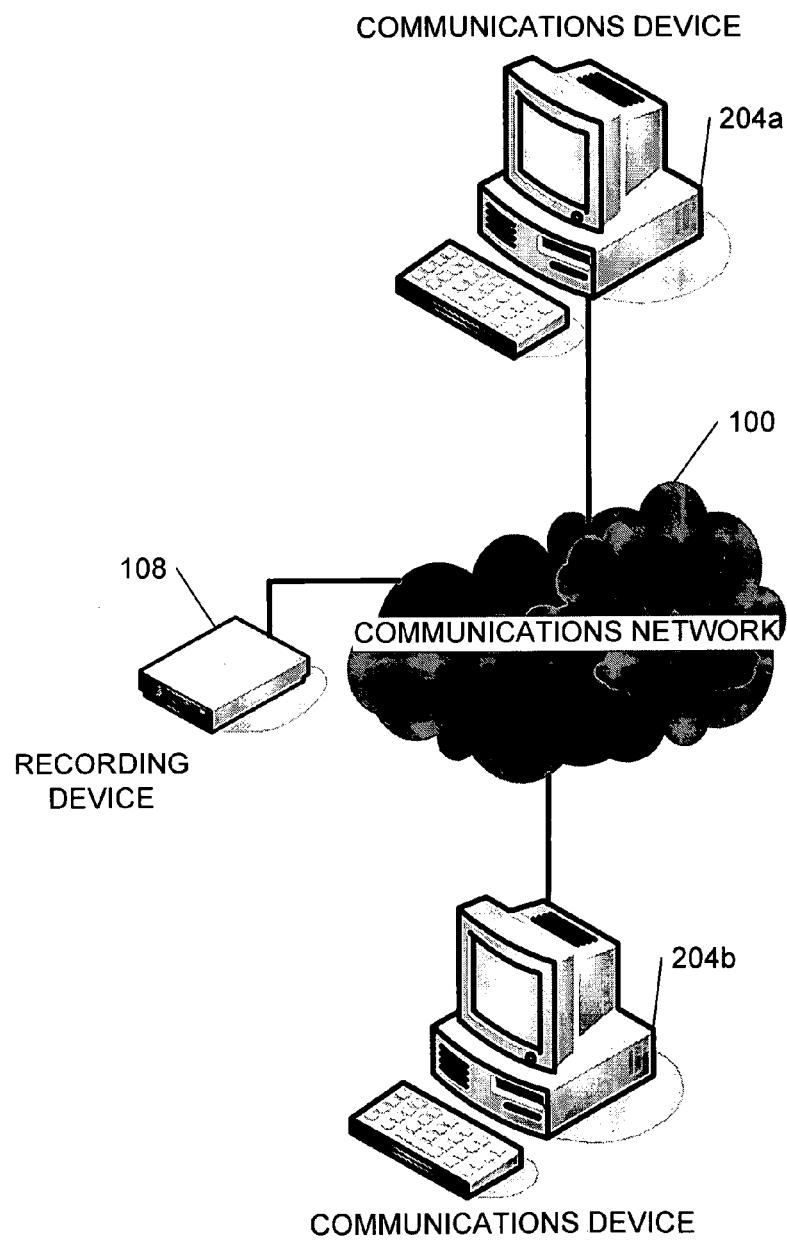
FIG. 2 is a network diagram illustrating another exemplary configuration for recording a communication using a remote recording device.

FIG. 2 is an exemplary network diagram illustrating another exemplary configuration for recording a communication using a remote recording device. More specifically, in this nonlimiting example, communications devices 204a and 204b are coupled to communications network 100. While communications devices 204a and 204b are illustrated as being similar to computing device 104, communications devices 204a and 204b are configured to operate with the functionality of both communications device 106 and computing device 104 (such as a softphone). As one of ordinary skill in the art will understand, communications devices 204a, 204b can be similar hardware (such as a headset, handset, or other device) for sending and receiving audio (as well as other) data related to a communication that is present in communications devices 104a, 104b. Other embodiments of communications devices 204a, 204b include logic for implementing a softphone. In any event, communications devices 204a, 204b are configured with most, if not all of the functionality of communications device 106 and computing device 104.

As also illustrated in FIG. 2, recording device 108 is coupled to communications network 100. In this configuration, recording device 108 is configured remotely from communications device 204a and communications device 204b. Such a configuration can involve coupling the recording device 108 to a path of communication between communication device 204a and communication device 204b. While this configuration is beneficial in networks where a physical connection exists between communications device 204a and communications device 204b, such a configuration is has historically been difficult to implement when operating over a data network, such as the Internet.

More specifically, in an exemplary embodiment, communications device 204a receives a voice communication, a visual communication, and/or a data communication (or any permutation of these and other types of communication) from a user operating communications device 204b. Communications device 204b converts the communication received from a user of communications device 204b into a plurality of packets, which generally include a header and a payload. The packets are sent individually to a destination address associated with communications device 204a, intermediate gateway, conference bridge, etc. The destination address is listed in each packet header. To increase the speed that this data is communicated to communications device 204a, each packet is configured to traverse a path of least resistance along the communications network. Because each packet traverses a path of least resistance, each packet can potentially take a different path between communications device 204b and communications device 204a.

When all (or a predetermined number) of the packets reach communications device 204a, the communications device 204a reads the packet headers to determine how to convert the payload data back to a format that is understandable to a user of communications device 204a. When a user associated with communications device 204a responds, a similar process is completed to communicate the voice to the user associated with communications device 204b. Because in such a configuration, packet data is communicated over a plurality of paths, a recording device coupled to a single path of the communications network can be problematic as a desired number of packets associated with the communication may not be received by recording device 108.

More recent attempts to implement a recording device remote from the endpoints (communications devices 204a, 204b) of a communication have included forwarding an exact duplicate of the communication to the recording device. More specifically, as packets are sent between endpoints of the communication at a predetermined rate (e.g., 20 milliseconds), an exact duplicate of this data is sent at the same rate to the recorder. Such a configuration, while overcoming many of the obstacles of passive tap recording is not without inefficiencies.

Figure 3:
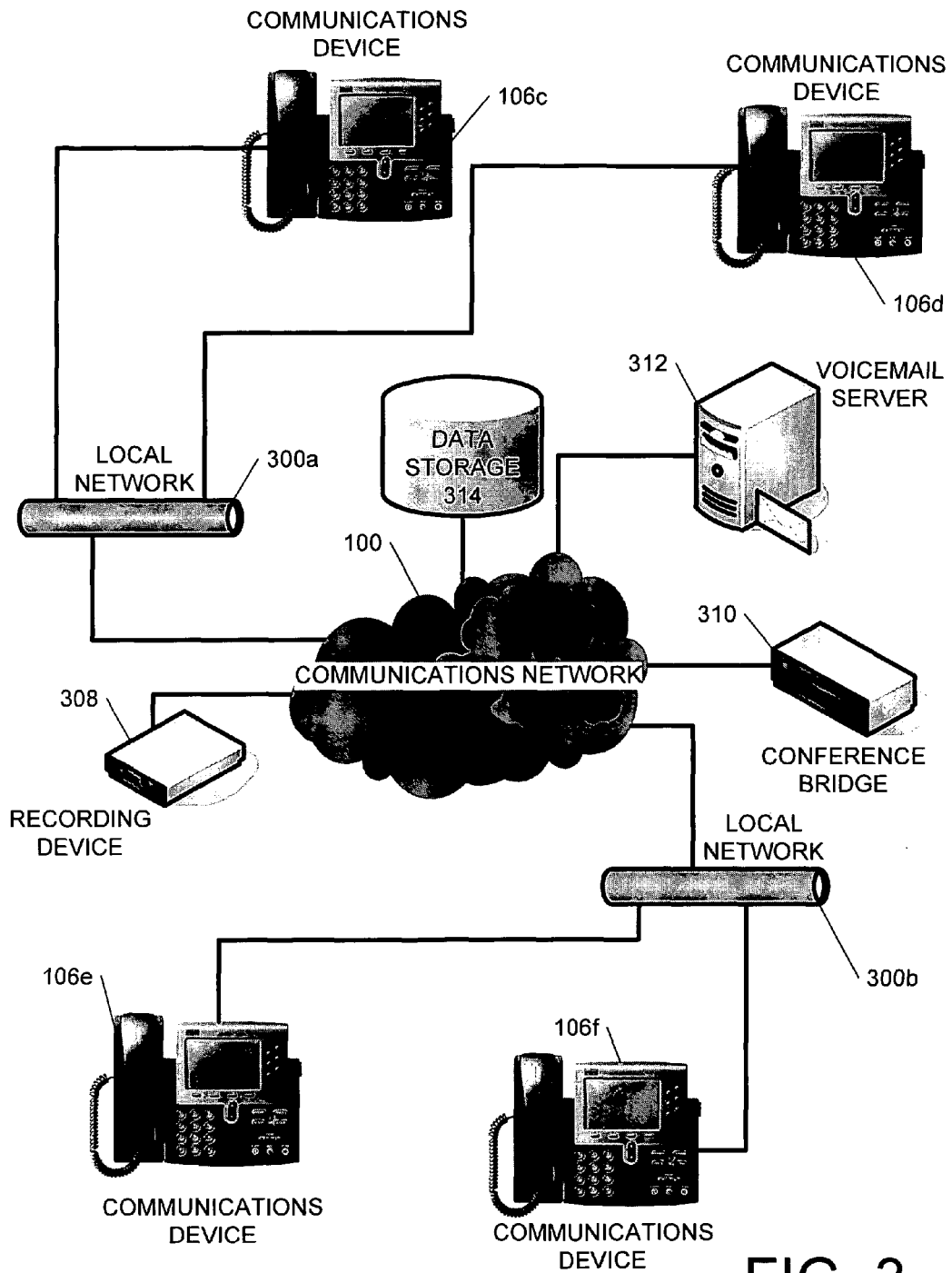
FIG. 3 is an exemplary network diagram illustrating a plurality of network components that may be present in a communications network, illustrating a configuration for duplicative recording of a communication.

FIG. 3 is an exemplary network diagram illustrating a plurality of network components that may be present in a communications network, further illustrating a configuration for recording a communication using a remote recording device. Similar to the network from FIGS. 1 and 2, the nonlimiting example of FIG. 3 includes a plurality of communications devices 106c, 106d, 106e, and 106f. However, in this exemplary communications network, a local network 300a is also coupled to communications devices 106c and 106d. Similarly, local network 300b is coupled to communications devices 106e and 106f. Also included is a voicemail server 312, a conference bridge 310, and data storage 314. Recording device 308 is coupled to communications network, similar to the configuration from FIG. 2.

One should note that, while the nonlimiting examples of FIGS. 2 and 3 illustrate communications device 106, this is but a nonlimiting example. Other communications devices and/or computing devices may be added or substituted for the communications devices in FIGS. 2 and 3. Depending on the particular network, various components may be utilized to provide the desired functionality.

One should also note that, depending on the particular configuration, data sent to the recorder(s) can be encrypted in any of a plurality of ways. More specifically, any of a plurality of protocols and/or any of a plurality of encryption techniques can be implemented to provide more secure data transfer.

Figure 4:
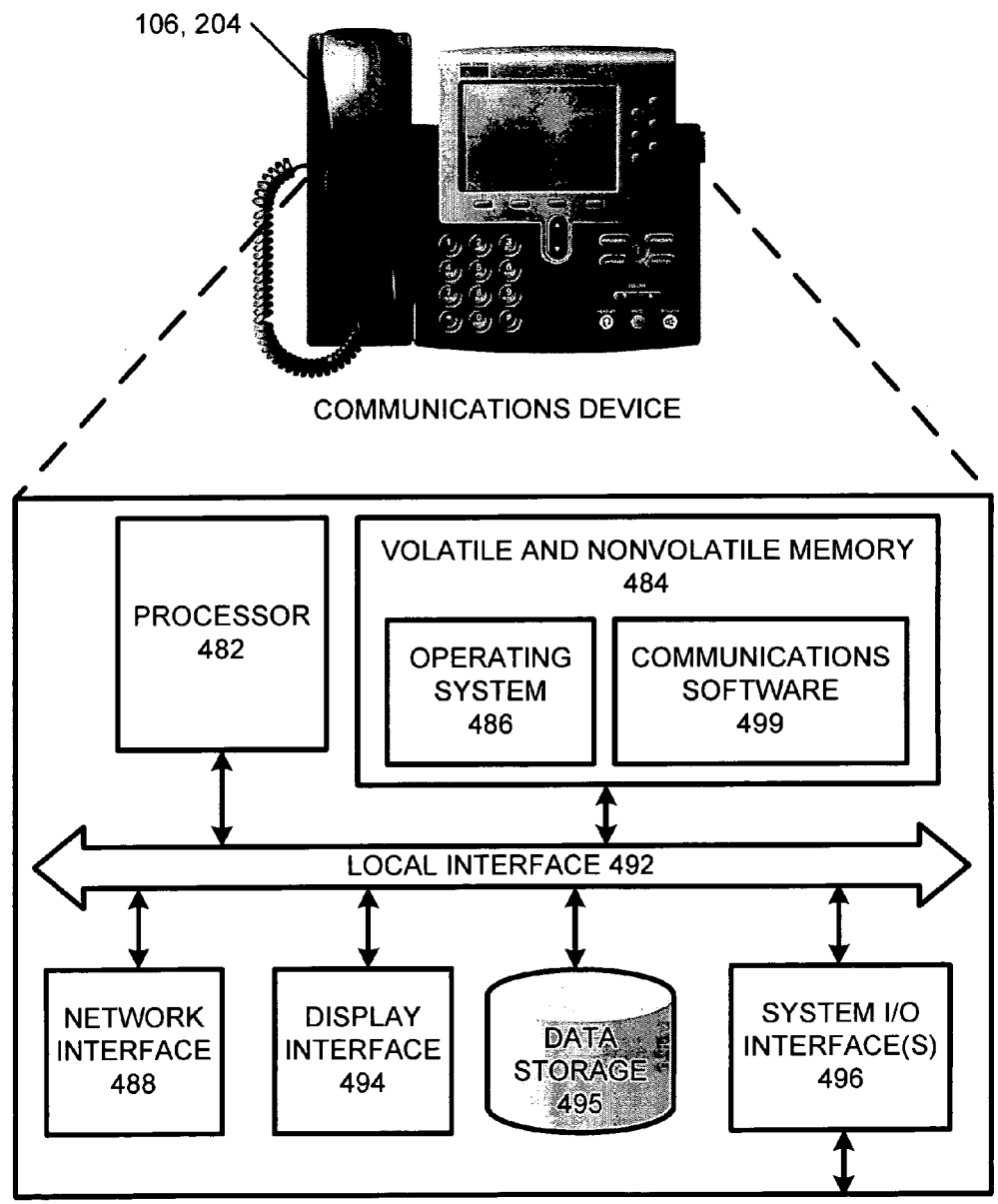
FIG. 4 is a diagram illustrating an exemplary embodiment of a communications device and/or computing device that may be configured to communicate via a communications network such as the networks from FIGS. 1 and 2.

FIG. 4 is an exemplary diagram illustrating an embodiment of a computing device and/or communications device that may be configured to communicate via a communications network such as the networks from FIGS. 1 and 2. Although a wire-line device is illustrated, this discussion can be applied to any device. Generally, in terms of hardware architecture, as shown in FIG. 4, the device 106, 204 includes a processor 482, volatile and nonvolatile memory 484, a display interface 494, data storage 495, and one or more input and/or output (I/O) device interface(s) 496 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the device 106, 204, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 484 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 484 may incorporate electronic, magnetic, optical, and/or other types of storage media. Note that the volatile and nonvolatile memory 484 can have a distributed architecture, where various components are situated remote from one another, but can be accessed by the processor 482. Additionally, volatile and nonvolatile memory 484 can also include an operating system 486, as well as communications software 499.

The software in volatile and nonvolatile memory 484 may include one or more separate programs, each of which includes an ordered listing of executable instructions for implementing logical functions. In the example of FIG. 4, the software in the volatile and nonvolatile memory 484 may include communications software client software 499, as well as operating system 486. The communications software 499 can include logic configured to converting voice data into a format for transmission over a data network, as well as logic configured to otherwise facilitate a communication. As a non-limiting example, embodiments of communications software 499 are configured to convert received voice data into a plurality of packets for transmission via the Internet. Additionally, in at least one nonlimiting example, communications software 499 is configured to convert visual data (as well as other types of data) into a format for transmission via the Internet.

Similarly, with respect to operating system 486, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 can be configured to control the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System 486.

The Input/Output devices that may be coupled to system I/O Interface(s) 496 may include input devices, for example but not limited to, a keyboard, mouse, scanner, microphone, headset, handset, microphone, earphone, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the communications device 106, 204 is a personal computer, workstation, or the like, the software in the volatile and nonvolatile memory 484 may further include a basic input output system (BIOS) (omitted for simplicity). The BIOS is a set of software routines that initialize and test hardware at startup, start the Operating System, and support the transfer of data among the hardware devices. The BIOS is stored in ROM so that the BIOS can be executed when the communications device 106 is activated.

When the communications device 106 is in operation, the processor 482 is configured to execute software stored within the volatile and nonvolatile memory 484, to communicate data to and from the volatile and nonvolatile memory 484, and to generally control operations of the communications device 106 pursuant to the software. Software in memory, in whole or in part, are read by the processor 482, perhaps buffered within the processor 482, and then executed.

Figure 5:
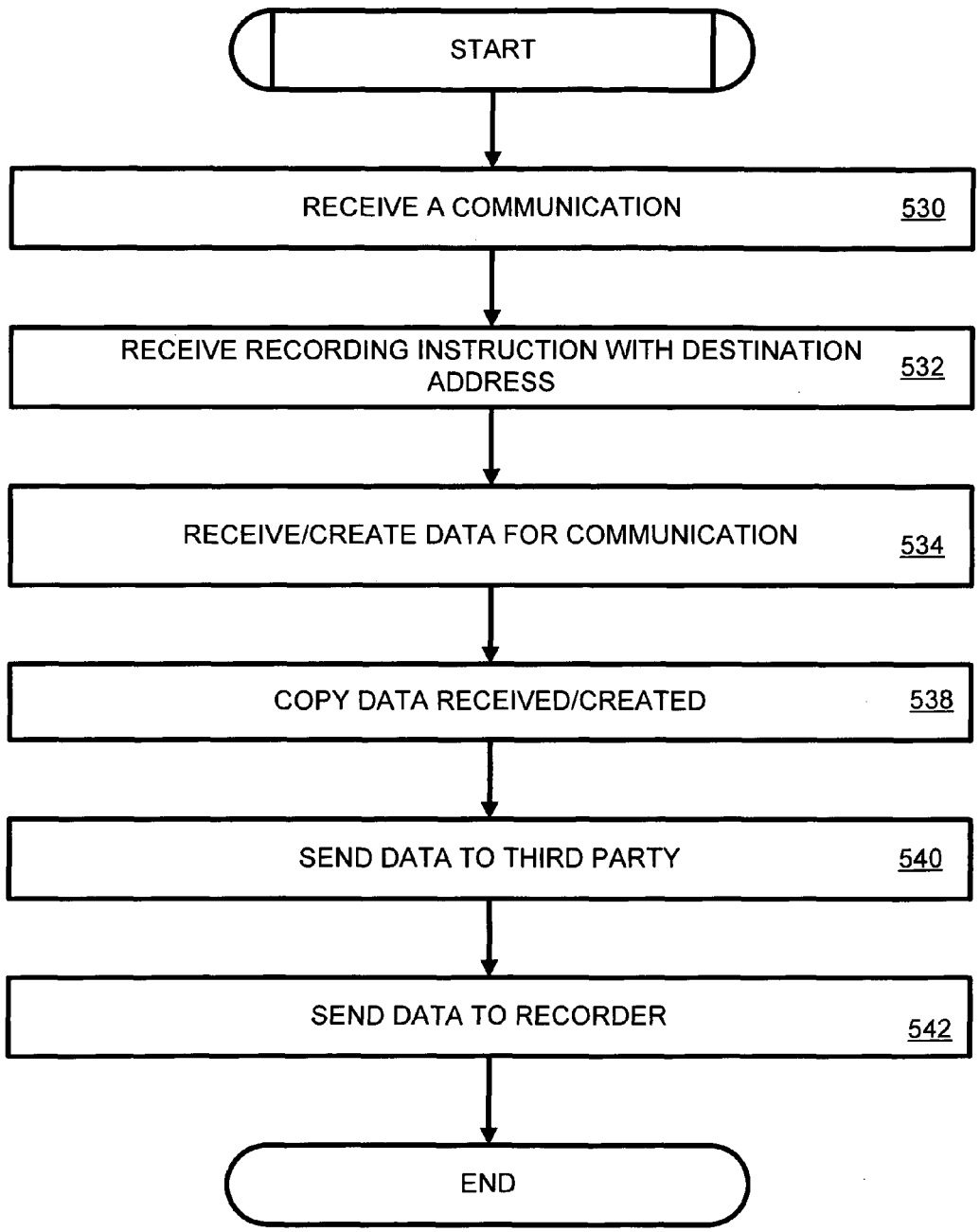
FIG. 5 is a flowchart illustrating exemplary steps that can be taken by a communications device for recording a communication in a communications network, such as the communications network from FIG. 3.

FIG. 5 is a flowchart illustrating exemplary steps that can be taken by a communications device for recording a communication in a communications network, such as the communications network from FIG. 3. The first step in this nonlimiting example is for a communications device to receive a communication (block 530). The communication can be received from a user directly (i.e., placing an outgoing call) or from the network (i.e., receiving an incoming call). Regardless, once the communication is received, the communications device receives a recording instruction with a destination address (block 532). This recording instruction can be received via a remote recording device. The remote recording device can be configured to determine when a recording is desired and can send an address for the communications device to send data for recording.

Once the communications device receives the recording instruction, the communications device can receive and/or create data for a communication (block 534). More specifically, this step includes the communications device receiving a voice communication (or other type, such as video, web chat, email, etc., as discussed above) from the user or data related to a voice communication from a third party (with whom the user is communicating). Once the data is created and/or received, the communications device sends a copy of the data to the third party (block 540). The communications device can then send the data to the recorder for recording (block 542).

Figure 6:
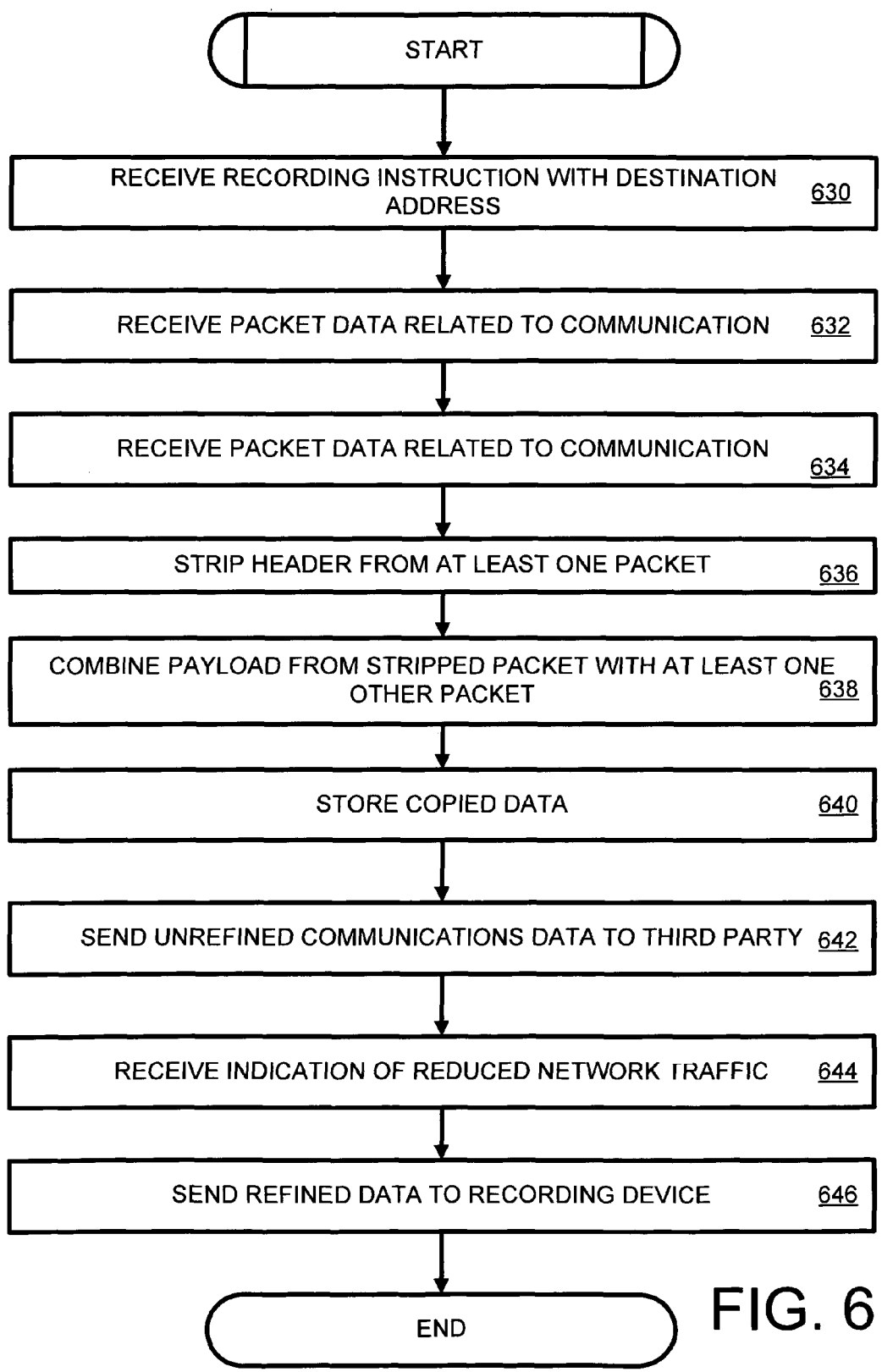
FIG. 6 is a flowchart illustrating exemplary steps that can be taken by a communications device in buffering a recording in a communications network, such as the communications network from FIG. 3.

FIG. 6 is a flowchart illustrating exemplary steps that can be taken by a communications device for lossless recording of a communication a communications network, such as the communications network from FIG. 3. The first step in this nonlimiting example is for a communications device to receive a recording instruction with a destination address (block 630). Next, the communications device can receive packet data related to a communication (block 632). Similar to the nonlimiting example from FIG. 5, the packet data related to a communication can come in the form of an incoming call or an outgoing call. Once communication and the recording instruction are received, the communications device can strip the header from at least one received packet. As one of ordinary skill in the art will understand, IP packets (such as RTP packets) generally include a header and a payload. The header can include any of a plurality of administrative data such as version, extension, payload type, etc. The payload of an IP packet generally includes traffic data. More specifically, in the nonlimiting example of a voice communication, the payload generally includes data that comprises the substance of the communication (or at least a portion thereof). Depending on the particular protocol being utilized, the packet data can be communicated with a certain size of header and payload. Additionally, the packet data is, depending on the particular protocol, sent to a destination in predetermined intervals (such as 20 milliseconds).

Next, the communications device can strip the header from at least one packet (block 634). Upon stripping the header, the communications device can combine the payload from at least one stripped packet with at least one other packet (block 636). By combining two packet payloads into a single packet, the communication device can more efficiently send data to the recorder. As a nonlimiting example, if the received packet data is configured for transmission in 20 millisecond intervals, by combining two packets into one, the recorder can receive the data in roughly half the time that unrefined data would be communicated (one should note that depending on header size, the actual efficiency gains can vary).

Next, the communications device can store the refined data for subsequent communication (block 638). The data can be stored in a buffer such that payload data from a plurality of packets can be accumulated. When the buffer reaches maximum capacity, a single, larger packet can be created for subsequent transmission. The communications device can then copy the received data related to the communication (block 640). The communications device can then send unrefined data to a third party of the communications (block 642). More specifically, the communications device can further facilitate the communication by sending packetized voice data from the user to the third party, to whom the user is communicating. As one of ordinary skill in the art will understand, this step can be performed before, during, and/or after the other steps in this nonlimiting example. Next, the communications device can receive an indication of reduced network traffic (block 644). Upon receiving the indication of reduced network traffic, the communications device can send the refined data to the recorder (block 646).

One should note that other embodiments may provide that any component within the IP telephone network through which some or all of the audio content of a call passes is configured to process and record media streams. This can include trunk interface cards, conference bridges, voicemail and other servers, routing components trans-coding components etc. Additionally, in still other embodiments, the communications device can, if instructed, merge the two data streams (incoming and outgoing data streams) into a single data stream. This may be accomplished by encapsulating a pair of packets (such as RTP packets) inside a User Datagram Protocol (UDP) payload. Many techniques place two RTP packets in the payload of a UDP packet, preceded by two by 16 bit length fields indicating the length of each RTP packet. At least one embodiment of the present disclosure includes removing the redundant information in the RTP packet header (e.g., the source of one is the destination of the other).

Figure 7:
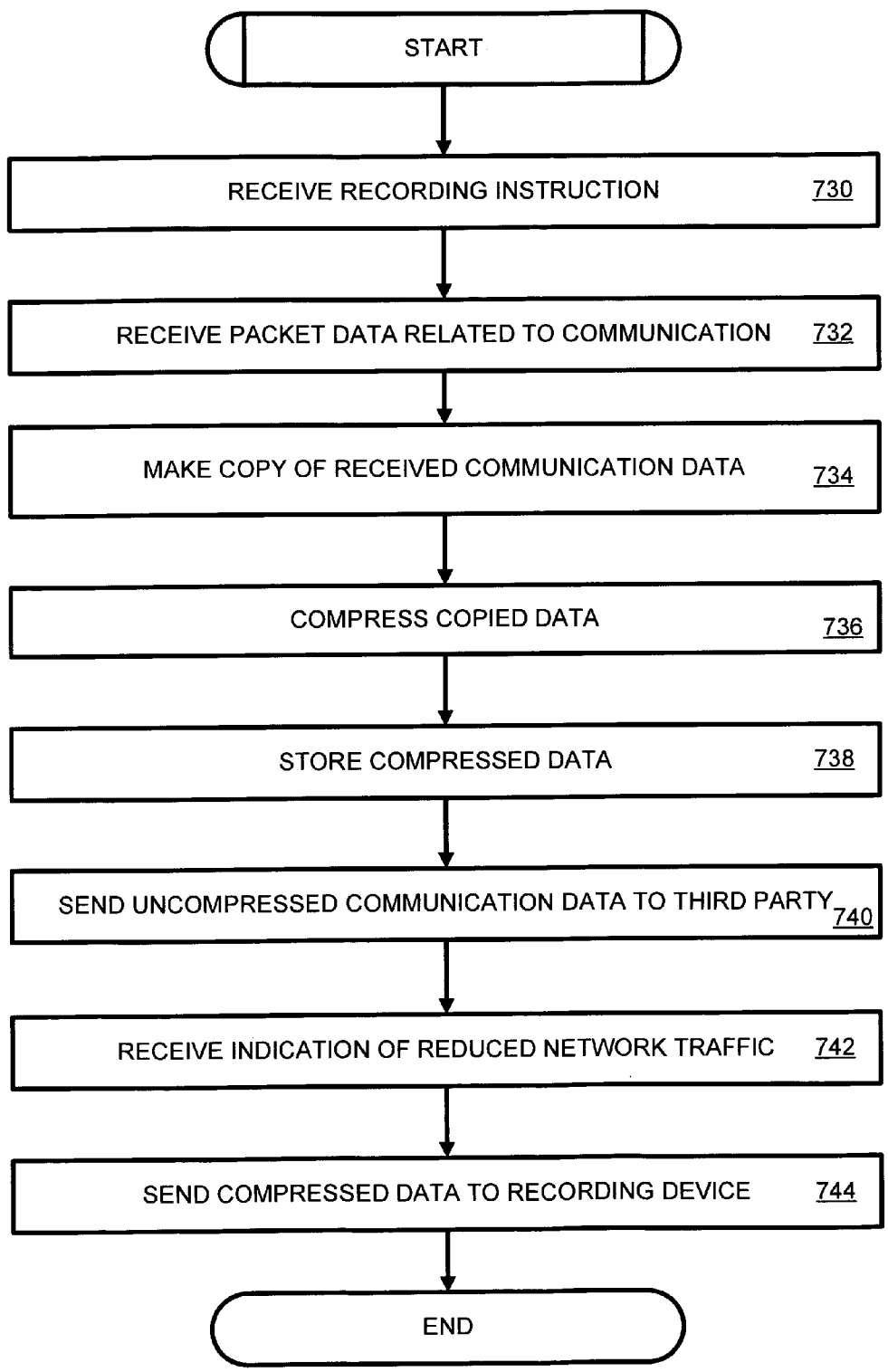
FIG. 7 is a flowchart illustrating exemplary steps that can be taken by a communications device for lossy recording of a communication in a communications network, such as the network from FIG. 3.

FIG. 7 is a flowchart illustrating exemplary steps that can be taken by a communications device for lossy recording of a communication in a communications network, such as the network from FIG. 3. More specifically, the first step in the nonlimiting example of FIG. 7 is for the communication device to receive a recording instruction (block 730). Next, the communications device can receive packet data related to a communication (block 732). Once the communications device has received the recording instruction and data related to the communication, the communications device can copy at least a portion of the packet data related to the communication (block 734).

Next, the communications device can compress the copied data (block 736). The compression can take the form of G729A, G711, or other compression format. Once the data is compressed, the communications device can store the compressed data (block 738) for subsequent delivery. The communications device can send the uncompressed data to the third party (to whom the user is communicating), as illustrated in block 740. Then, the communication device can receive an indication of reduced network traffic (block 742) and send the compressed data to the recorder (block 744).

One should note that since the recording device is generally a receive-only device, echo is generally not a concern when recording. Therefore, there is generally no hard real-time requirement on transmission time or jitter. Hence at least one embodiment of the communications device can be configured support an option to send traffic to the recorder as "data" rather than "real-time" packets (e.g. if using Quality of Service graded networks, the traffic to the recording device need not be marked as requiring rapid delivery). This allows the recorder traffic to co-exist on limited bandwidth networks with the real VoIP traffic and not degrade the service experienced by the VoIP calls. The communications device is configured to send traffic at times of reduced network traffic, thereby giving priority to the real-time voice traffic.

Figure 8:
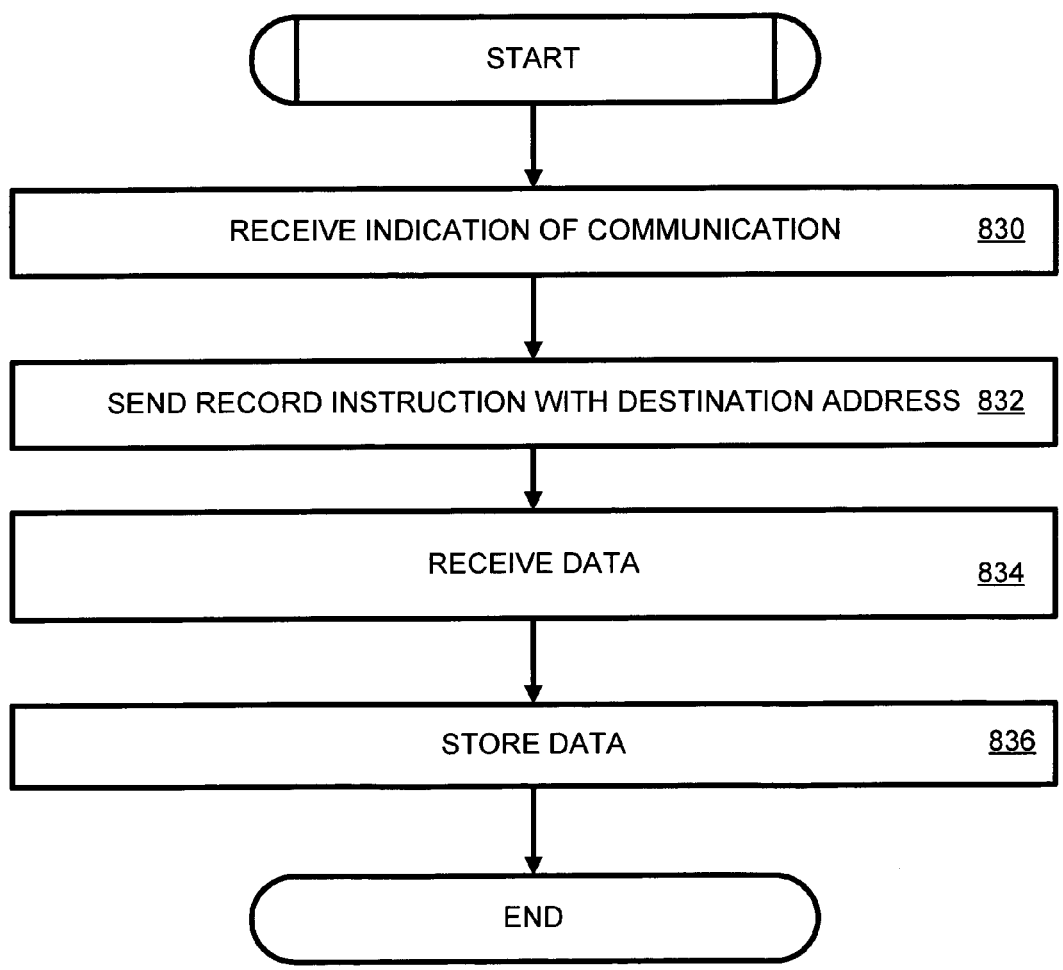
FIG. 8 is a flowchart illustrating exemplary steps that can be taken by a communications device in sending data related to a communications to a recording device in a communications network, such as the communications network from FIG. 3.

FIG. 8 is a flowchart illustrating exemplary steps that can be taking by a remote recording device for recording a communication in a communications device, such as the communications network from FIG. 3. The first step in the nonlimiting example of FIG. 8 is for the recording device to receive an indication of a communication (block 830). Depending on the particular configuration, an indication of a communication may or may not include a record request. Once the call indication is received, the recording device sends a record instruction with a destination address (block 832). In at least one embodiment, the destination address includes an address for sending data to the recording device. Once the record instruction is sent, the recording device can receive data related to the communication (block 834) and store the received data (block 836).

Additionally, embodiments of the communications device can, if instructed, forward packets containing mixed audio of the transmitted and received streams. As the communications device can be configured to decompress incoming packets and is responsible for any compression of outgoing packets, the communications device may already have access to the uncompressed audio and hence can mix these data streams (as the communications device does when applying side-tone to the received audio the communications device plays via the ear piece). Instead of forwarding the raw contents of the RTP packets, the communications device can be configured to take (a) audio that has been converted into linear form and ready for output to the handset/speaker and (b) audio the communications device has collected from the microphone and is in linear format prior to compression. The communications device can be configured to add (a) and (b) together to provide the mixed audio signal. The communications device can then compress this mixed data (using the compression format, if any, requested by the recorder) and place this in RTP packets for transmission to the recorder. Further, as communications devices generally support a range of compression formats, and with Digital Signal Processing (DSP) power increasing to the point where there is spare processing power available, the communications device can be instructed to compress the audio (whether split or mixed) before packetizing and sending the audio data to the recorder. As a lower quality of audio is often acceptable in a recording than in a live call, a more aggressive compression format is applied to the recorded stream than was applied to the original audio. This can result in reduced bandwidth consumption during recording.

One should also note that rather than forward RTP packets to the recorder, at least one embodiment of the communications device can be configured to support the establishment of a reliable connection to the recorder (e.g. full TCP/IP socket connection). This allows the packets being sent to the recorder (a) to be received reliably with retransmission being handled by the TCP stack (a critical requirement in some recording applications) and (b) allows this recording stream to traverse the network at a lower Quality of Service threshold than the VoIP calls. This means that the network does not have to be capable of supporting the sum of live plus recorded traffic at the same high quality generally utilized in VoIP calls. Additionally, embodiments of the communications device are configured to establish contact with the recorder and accept subsequent instructions (e.g. start/stop, mix, compress, buffer) directly from the recorder, rather than having these commands delivered via the other components of the telephone system. Still other embodiments of the communications device are configured to support multiple concurrent and independent requests for forwarding/copying/buffering of data from multiple recorders. This allows, as a nonlimiting example, live monitoring and recording concurrently. The communications device can be configured to perform the forwarding operation as many times and to as many different addresses as requested. This also works well for live backups (where recordings are sent to two different locations in real time) These techniques are often more secure than having one recorder store the data and then copy that data to another location.

This technique can usefully exploit the normally spare bandwidth that may be available between a satellite site and the backup parent site (i.e., WAN designed to have traffic communicated from A to B but has additional capacity to communicate data from A to C to allow continued operation in the event of failure of site B. This bandwidth is often otherwise unused and it may be desirable for A to send data to both B and C than to have the data copied from B to C at a later time.

In addition to sending audio content of the communication, embodiments of the communications device may also be configured to receive requests to forward details of the quality of the call, derived, for example, from the Real Time Control Protocol (RTCP) packets exchanged with the remote party on the call. In addition to sending the audio content of the communication, the communications device may also be forwarded details of the call. Information available to the communications device, whether made visible to the user or not, can be forwarded to the recorder. Additionally, embodiments of the communications device can be configured to forward details of the user's interaction with the communications device and the recorder. As a nonlimiting example, embodiments of the communications device can be configured to forward data such as speed of dialing, time when the communications device goes off-hook, etc. (i.e. events that do not form part of the normally recorded call).

Also included within the scope of this disclosure is packet loss detection and analysis. By analyzing the sequence numbers and timestamps of the RTP packets, one can determine the proportion of packets have been lost. Alarms can be raised should this exceed an acceptable threshold. Where two streams are sent from a device (those the device received and those the transmitted), it is possible to determine from the loss characteristics whether packet loss is occurring between the recorder and the device performing the duplication (in which case losses on the two streams should be comparable) or between the two devices engaged in the original communication (in which cases losses are heavier on one stream—that duplicating the packets received by the forwarding device—than on the other).

Additionally included within the scope of this disclosure is quantification of packet transmission statistics. In addition to forwarding the packets (such as RTP packets), if the forwarding device can also be configured to forward the RTCP packets sent that relate to the original RTP link. The recorder can analyze this data to determine the quality of transmission between the original parties on the call. If RTCP is exchanged between the recorder and the forwarding device, it can determine the quality of that link. An overall quality level for the recording can therefore be determined. Where RTCP packets are forwarded, these can be wrapped inside a protocol and buffered with the RTP streams so as not to use much additional bandwidth or sockets en route to the recorder.

One should also note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for recording in an Internet Protocol (IP) environment, comprising:
    receiving data related to a communication, wherein the data comprises a plurality of packets and each packet includes a header and a payload;
    listening for an instruction from a recording device that includes a destination address;
    generating a copied version of at least a portion of the received data in response to the instruction;
    modifying payloads of the packets of the copied version of the received data by performing a plurality of actions consisting of lossless compression of the received data, combining the payloads of at least two packets of the received data and reducing a size component of the headers of the packets of the copied version of the received data; and
    sending at least a portion of the modified copied version of the received data to the recording device, the sending including determining if the modified copied version is to be sent as real-time packets or data packets.

2. The method of claim 1, wherein modifying payloads of the packets of the copied version of the received data includes transmitting at least a portion of the modified copied version of the received data in intervals that are shorter than the received data is received.

3. The method of claim 1, wherein modifying payloads of the packets of the copied version the copied version of the received data includes performing lossy compression on the payloads of the packets.

4. The method of claim 1, wherein modifying payloads of the packets of the copied version of the received data includes reducing quality of the payloads of the packets.

5. A non-transitory computer readable medium containing computer executable instructions that when executed by a computing device perform a method for recording in an Internet Protocol (IP) environment, comprising:
    receiving data related to a communication, wherein the data comprises a plurality of packets and each packet includes a header and a payload;
    listening for an instruction from a recording device that includes a destination address;
    generating a copied version of at least a portion of the received data in response to the instruction;
    modifying payloads of the packets of the copied version of the received data by performing a plurality of actions consisting of lossless compression of the received data, combining the payloads of at least two packets of the received data and reducing a size component of the headers of the packets of the copied version of the received data, and
    sending at least a portion of the modified copied version of the received data to the recording device, the sending including determining if the modified copied version is to be sent as real-time packets or data packets.

6. The non-transitory computer readable medium of claim 5, wherein modifying payloads of the packets of the copied version of the received data further includes instructions for transmitting at least a portion of the modified copied version of the received data in intervals that are shorter than the received data is received.

7. The non-transitory computer readable medium of claim 5, wherein modifying payloads of the packets of the copied version of the received data further includes instructions for executing lossy compression on the payloads of the packets.

8. The non-transitory computer readable medium of claim 5, wherein modifying payloads of the packets of the copied version of the received data further comprises instruction for reducing quality of the payloads of the packets.

9. A communications device for facilitating a recording in an Internet Protocol (IP) environment, comprising: a memory; a network interface; a processor, wherein the processor executes instructions to:
    receive data related to a communication, wherein the data comprises a plurality of packets and each packet includes a header and a payload;
    listen for an instruction from a recording device that includes a destination address;
    generate a copied version of at least a portion of the received data in response to the instruction;
    modify payloads of the packets of the copied version of the received data by performing a plurality of actions consisting of lossless compression of the received data, combining the payloads of at least two packets of the received data and reducing a size component of the headers of the packets of the copied version of the received data; and send at least a portion of the modified copied version of the received data to the recording device, wherein it is determined if the modified copied version is to be sent as real-time packets or data packets.

10. The communications device of claim 9, wherein the communications device includes at least one of the following: an Internet Protocol (IP) telephone, a softphone, a web conference enabled communications device, an email enabled communications device, or an instant messaging enabled communications device.

11. The communications device of claim 9, wherein the processor further executes instructions to execute lossy compression on the payloads of the packets.

* * * * *